United States Patent [19]
Lee

[11] Patent Number: 5,479,089
[45] Date of Patent: Dec. 26, 1995

[54] POWER CONVERTER APPARATUS HAVING INSTANTANEOUS COMMUTATION SWITCHING SYSTEM

[75] Inventor: James Lee, Monterey Park, Calif.

[73] Assignee: Hughes Aircraft Company, Los Angeles, Calif.

[21] Appl. No.: 360,871

[22] Filed: Dec. 21, 1994

[51] Int. Cl.⁶ .................................. G05F 1/40; G05F 1/00
[52] U.S. Cl. .......................... 323/283; 323/222; 323/282
[58] Field of Search ..................................... 323/222, 223, 323/225, 271, 282, 283, 284, 295, 289; 363/16, 21, 19, 23, 25; 327/392, 394, 396, 399

[56] References Cited

U.S. PATENT DOCUMENTS

| | | | |
|---|---|---|---|
| 4,395,675 | 7/1983 | Toumani | 323/271 |
| 4,678,984 | 7/1987 | Henze | 323/283 |
| 5,072,171 | 12/1991 | Eng | 323/283 |
| 5,138,249 | 8/1992 | Capel | 323/283 |
| 5,216,349 | 6/1993 | Kanouda et al. | 318/105 |
| 5,233,287 | 8/1993 | Lenk | 323/222 |
| 5,304,875 | 4/1994 | Smith | 363/21 |
| 5,359,280 | 10/1994 | Canter et al. | 323/282 |
| 5,412,308 | 5/1995 | Brown | 323/222 |

*Primary Examiner*—Matthew V. Nguyen
*Attorney, Agent, or Firm*—Terje Gudmestad; W. K. Denson-Low

[57] ABSTRACT

A switching system and a power converter for use therewith are disclosed. A first switching device (20) selectively couples and uncouples a first terminal (26) of an inductor (24) to a predetermined signal line (22) in dependence upon a first control signal received along a control input (30). A second switching device (32) selectively couples and uncouples the first terminal (26) of the inductor (24) to ground in dependence upon a second control signal received along a control input (36). A switch controller (60) generates the first and second control signals based upon a pulsed signal generated by a pulsed signal source (46). The first control signal enables the first switching device (20) when both the pulsed signal is at a first logical level and the voltage at the control input (36) of the second switching device (32) is less than a predetermined threshold.

25 Claims, 2 Drawing Sheets

POWER CONVERTER APPARATUS HAVING INSTANTANEOUS COMMUTATION SWITCHING SYSTEM

TECHNICAL FIELD

The present invention relates generally to electric power converters, and more particularly, to switching power converters.

BACKGROUND OF THE INVENTION

An electric power converter is an apparatus which converts electric power from one form into another form. Classes of electric power converters include AC-to-DC converters, AC-to-AC converters, DC-to-AC converters, and DC-to-DC converters. A conventional DC-to-DC converter comprises an inductor interposed between an input supply and an output, and a switching device which is controlled by a pulse-width modulator. The switching device alternately causes energy from the input supply to be stored in the inductor, and energy stored in the inductor to be provided to the output. By varying the duty cycle of the pulse-width modulator, the voltage at the output of the converter can also be varied. The location of the switching device within the converter is dependent upon the specific configuration employed, e.g. a buck converter configuration or a boost converter configuration.

In a conventional buck converter configuration, current passing through the inductor to the output causes an electromagnetic force on the inductor when the switching device is on. When the switching device is turned off, the electromagnetic force collapses, inducing a flyback current which flows to the output through a commutating diode. This configuration is disadvantageous in that its resulting efficiency is reduced by the conduction loss due to the commutating diode.

U.S. Pat. No. 5,072,171 to Eng discloses an improved switching converter which employs a synchronized switching system. This system includes a main switch, a commutation switch, and a Schottky flyback diode. The main switch and the commutation switch are controlled by a digital logic circuit in dependence upon a pulse width modulated signal. A preset delay signal is employed in the digital logic circuit in order to prevent simultaneous conduction of the two switches between the time at which the commutation switch is turned off and the time at which the main switch is turned on. FIG. 1 illustrates the resulting current flow through the main switch, the commutation switch, and the Schottky diode as a function of time. Since conduction loss in the commutation switch is less than in the Schottky diode, the resulting efficiency is improved as the conduction period through the Schottky diode is reduced. However, the current flow through the Schottky diode during the preset delay period degrades the efficiency of the converter.

SUMMARY OF THE INVENTION

It is an object of the present invention to improve the efficiency of a switching power converter.

A further object of the present invention is to reduce the conduction loss in a switching power converter.

A still further object of the present invention is to reduce the delay period between turning off the commutation switch and turning on the main switch without incurring simultaneous conduction.

An additional object of the present invention is to reduce the number circuit components in a switching power converter.

In carrying out the above objects, the present invention provides a switching system for use in a power converter, wherein the power converter produces an output signal from an input power source, and wherein the power converter includes an inductor having a first terminal and a second terminal. A first switching device, having a control input terminal which receives a first control signal, selectively couples and uncouples the first terminal of the inductor to a first predetermined signal line in dependence upon a first control signal. A second switching device, having a control input terminal which receives a second control signal, selectively couples and uncouples the first terminal of the inductor to a second predetermined signal line in dependence upon a second control signal. A pulsed signal source provides a pulsed signal. A switch controller generates the first control signal and the second control signal, wherein the first control signal enables the first switching device when both the pulsed signal is at a first logical level and the voltage at the control input of the second switching device is less than a first predetermined threshold.

Further in carrying out the above objects, the present invention provides a switching power converter having an output and an input which receives an input power source. An inductor has a first terminal and a second terminal which is coupled to the output. A capacitor couples the second terminal of the inductor to ground. A first MOSFET includes a drain coupled to the input, a source coupled to the first terminal of the inductor, a substrate connected to the source, and a gate. A second MOSFET includes a drain coupled to the first terminal of the inductor, a source coupled to ground, a substrate connected to the source, and a gate. A pulsed signal source provides a pulsed signal having a duty cycle based upon the voltage at the output. A switch controller, coupled to the pulsed signal source and the second MOSFET, provides a first control signal to the gate of the first MOSFET and provides a second control signal to the gate of the second MOSFET. The first control signal turns on the first MOSFET when both the pulsed signal is at a first logical level and the voltage at the gate of the second MOSFET is less than a first predetermined threshold. The first control signal turns the first MOSFET off when the pulsed signal transitions to a second logical level. The second control signal turns on the second MOSFET when both the pulsed signal is at the second logical level and the voltage at drain of the second MOSFET is less than a second predetermined threshold. The second control signal turns the second MOSFET off when the pulsed signal transitions to the first logical level.

These and other features, aspects, and advantages of the present invention will become better understood with regard to the following description, appended claims, and accompanying drawings.

BEST MODES FOR CARRYING OUT THE INVENTION

Figure 2:
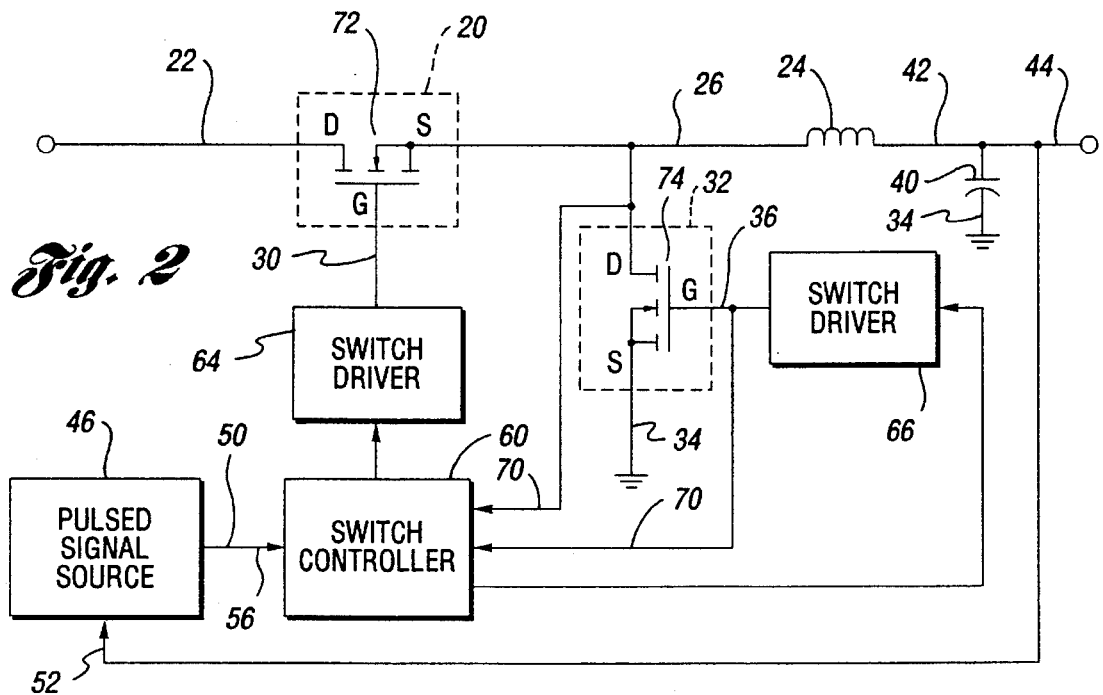
FIG. 2 is block diagram of an embodiment of a switching converter in accordance with the present invention.

A block diagram of an embodiment of a switching converter in accordance with the present invention is illustrated in FIG. 2. The switching converter includes a main switching device 20 connected between an input signal line 22 and an inductor 24. The main switching device 20 selectively couples and uncouples a first terminal 26 of the inductor 24 to the input signal line 22 in dependence upon a first control signal received at a control input 30. A commutation switching device 32 is connected between ground 34 and the junction of the main switching device 20 and the inductor 24. The commutation switching device 32 selectively couples and uncouples the first terminal 26 of the inductor 24 to ground in dependence upon a second control signal received at a control input 36. A capacitor 40 connects a second terminal 42 of the inductor 24 to ground 34. An output line 44 is connected at the junction of the inductor 24 and the capacitor 40.

A pulsed signal source 46 provides a pulsed signal along an output line 50. The pulsed signal is modulated in dependence upon a signal received along an input line 52. The input line 52 of the pulsed signal source 46 is connected to the output line 44 so that the duty cycle of the pulsed signal is varied in dependence upon the voltage produced at the output line 44. The feedback loop formed by connecting the output line 44 to the input line 52 is used to regulate the voltage produced at the output line 44. The pulsed signal source 46 can be formed using a standard commercially available integrated circuit configured as a pulse width modulator.

The output line 50 of the pulsed signal source 46 is applied to an input 56 of a switch controller 60. The switch controller 60 acts to alternately switch the main switching device 20 via a switch driver 64, and the commutation switching device 32 via a switch driver 66, based upon the pulsed signal. The switching commanded by the switch controller 60 is further based upon the observed voltage of the control input 36 and the voltage of the output of the commutation switching device 32 at the first terminal 26 of the inductor 24. Each of these voltages are applied to corresponding inputs 70 of the switch controller 60.

In a preferred embodiment, the main switching device 20 is formed by a MOSFET (metal oxide semiconductor field effect transistor) 72, having a drain connected to the input signal line 22, and a source connected to the junction of the inductor 24 and the commutation switching device 32. The substrate, i.e. the body, of the MOSFET 72 is directly connected to the source. The gate of the MOSFET 72 acts as the control input 30 which receives the output of the switch driver 64. It is noted the main switching device 20 is not limited to an embodiment containing the MOSFET 72, and as such, other types of switching devices known in the art may be employed.

The commutation switching device 32 is also preferably formed by a MOSFET 74. The drain of the MOSFET 74 is connected to the junction of the source of the MOSFET 72 and the first terminal 26 of the inductor 24. The gate of the MOSFET 74 is connected to the output of the driver 66. The gate and the drain of the MOSFET 74 are connected to the inputs 70 of the switch controller 60 so that switching of the MOSFETs 72 and 74 is based upon their respective voltage levels. The source and the substrate of the MOSFET 74 are connected to ground 34. As with the main switching device 20, the commutation switching device 32 is not limited to embodiments which contain the MOSFET 74.

Figure 3:
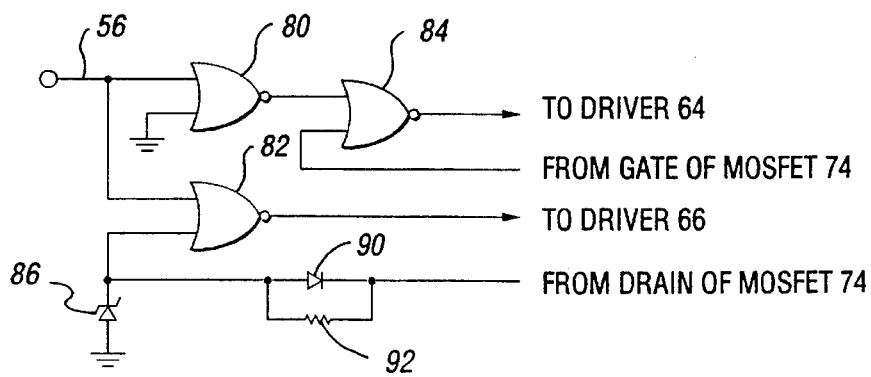
FIG. 3 is a schematic diagram of an embodiment of a switch controller circuit in accordance with the present invention.

An embodiment of the switch controller circuit 60 is illustrated by the schematic drawing in FIG. 3. The switch controller circuit is formed by three logical NOR gates 80, 82, and 84, a Zener diode 86, a diode 90, and a resistor 92. The NOR gate 80 has a first input which receives the pulsed signal produced by the pulsed signal source 46, and a second input which is connected to ground 34. As a result, the NOR gate 80 acts as an inverter gate which produces a logically high level at its output for a logically low input, and a logically low level at the output for a logically high input.

The NOR gate 84 has a first input connected to the output of the NOR gate 80 and a second input connected to the control input 36 of the commutation switching device 32. In embodiments where the commutation switching device 32 includes the MOSFET 74, the second input of the NOR gate 84 is connected to the gate of the MOSFET 74. The output of the NOR gate 84, which is provided to the switch driver 64 for switching the MOSFET 72, is logically high only when both the pulsed signal is logically high and the gate voltage is logically low. Otherwise, i.e. when the pulsed signal is logically low or when the gate voltage is logically high, the output of the NOR gate 84 is logically low. Therefore, the NOR gates 80 and 84 act to enable, i.e. to switch on, the main switching device 20 in response to both the pulsed signal being at a high logic level and the gate of the MOSFET 74 being discharged beyond a voltage threshold.

A first input of the NOR gate 82 is connected to receive the pulsed signal. A parallel combination of the diode 90 and the resistor 92 couples the drain of the MOSFET 74 to a second input of the NOR gate 82, wherein the anode of the diode is connected to the second input and the cathode is connected to the drain. The Zener diode 86 is connected between the second input of the NOR gate 82 and ground 34. In this configuration, the Zener diode 86 and the resistor 92 act to clamp the voltage applied to the second input of the NOR gate 82 based upon the drain voltage of the MOSFET 74. This clamping action is important when the drain voltage attains levels which exceed a gate supply voltage which powers the NOR gate 82. In practice, the Zener diode 86 is selected to have a breakdown voltage above the switching threshold voltage of the NOR gate 82 and below the gate supply voltage. The diode 90 acts to provide a fast discharge path for the junction capacitance of the Zener diode 86.

The output of the NOR gate 82, which is provided to the switch driver 66 for switching the MOSFET 74, is logically high only when both the pulsed signal is logically low and the drain voltage is logically low. Otherwise, i.e. when the pulsed signal is logically high or when the drain voltage is logically high, the output of the NOR gate 82 is logically low. Therefore, the NOR gate 82 acts to enable, i.e. to switch on, the commutation switching device 32 in response to both the pulsed signal being low and the MOSFET 72 being completely off.

In a preferred embodiment, the three NOR gates 80, 82, and 84 are located on the same integrated circuit, such as a low power, quad NOR CMOS integrated circuit. Those having ordinary skill in the art will recognize that other circuit implementations for realizing the logical functions for controlling the main switching device 20 and the commutation switching device 32, based upon the pulsed signal and the state of the converter, can be employed. For example, the same logical functions can be realized using NAND gates rather than NOR gates.

Figure 4:
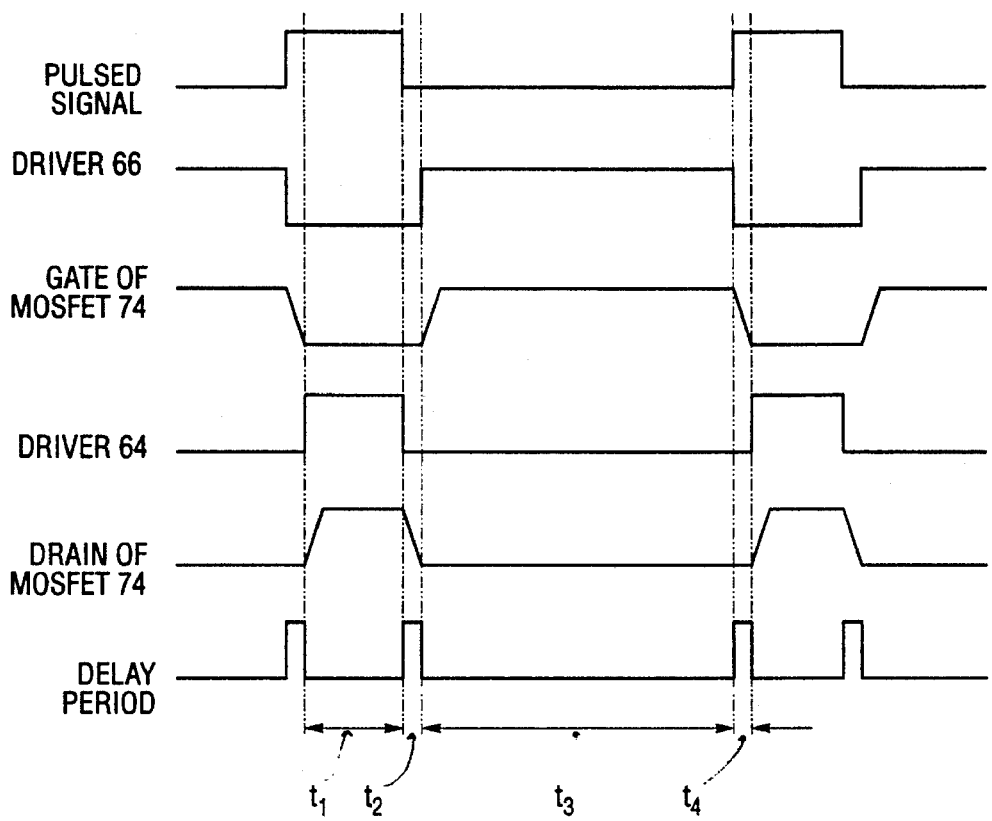
FIG. 4 is a timing diagram of the switch controller circuit.

A timing diagram illustrating the operation of the switch controller 60 within the converter is shown in FIG. 4. For a time period t1, the output of the pulsed signal source 46 is high, the commutation driver 66 is low, the gate of the MOSFET 74 is low, the main driver 64 is high, and the drain of the MOSFET 74 is high. This is the state of the converter when the main switching device 20 is on and the commutation switching device 32 is off. During this time period, power is supplied to a load coupled to the output line 44 from a power source applied to the input signal line 22. Also, the inductor 24 and the capacitor 40 are energized during time period t1. The time period t1 is referred to as a main drive period.

When the pulsed signal goes low, the output of the main driver 64 goes low which begins to turn off the main switching device 20. The output of the commutation driver 66 is held low by the high state of the drain of the MOSFET 74. As the MOSFET 72 turns off, the current in the inductor 24 charges the drain-to-source capacitance of the MOSFET 72. When the drain-to-source voltage of the MOSFET 72 reaches the voltage at the input signal line 22, the MOSFET 72 is essentially off. At this point, the drain of MOSFET 74 is at zero volts, and the commutation driver signal transitions to high. As a result, the commutation switching device 32 is enabled only when the main switching device 20 is completely off. The period of time to perform this transition from the main drive period to a subsequent commutation drive period is represented by t2 in FIG. 4. The duration of the time period t2 is dependent upon the time required to charge the gate of the MOSFET 74, which is short when a MOSFET switch driver is used. During the time when the gate of the MOSFET 74 is charging, current that was flowing through the inductor 24 commutates through an internal body diode formed by the drain and substrate. As a result, the MOSFET 74 switches on with minimal switching losses.

For a time period t3, which is referred to as a commutation drive period, the output of the pulsed signal source is low, the commutation driver signal is high, the gate of the MOSFET 74 is high, the main driver signal 64 is low, and the drain of the MOSFET 74 is low. This is the state of the converter when the main switching device 20 is off and the commutation switching device 32 is on. During time period t3, energy stored in the inductor 24 and the capacitor 40 is released. Commutation current flows from the source to the drain of the MOSFET 74.

When the pulsed signal transitions to high, the commutation driver signal goes low which begins to turn off the commutation switching device 32. The main driver signal is held low by the high state of the gate of the MOSFET 74. As the gate of the MOSFET 74 discharges to zero, the main driver signal transitions to high. Therefore, the main switching device 20 is enabled only when the commutation switching device 32 is off. The period of time to perform this transition from the commutation drive period to another main drive period is represented by t4 in FIG. 4. The duration of the time period t4 is dependent upon the time required to charge the gate of the MOSFET 72, which is short when a MOSFET switch driver is used. During the time when the gate of the MOSFET 74 is discharging, commutation current that was flowing through the MOSFET 74 flows through an internal body diode formed by the drain and substrate. The drain-to-source voltage of the MOSFET 74 is clamped to the diode drop while the MOSFET 74 is turning off. As a result, the MOSFET 74 switches off with minimal switching losses.

Figure 1:
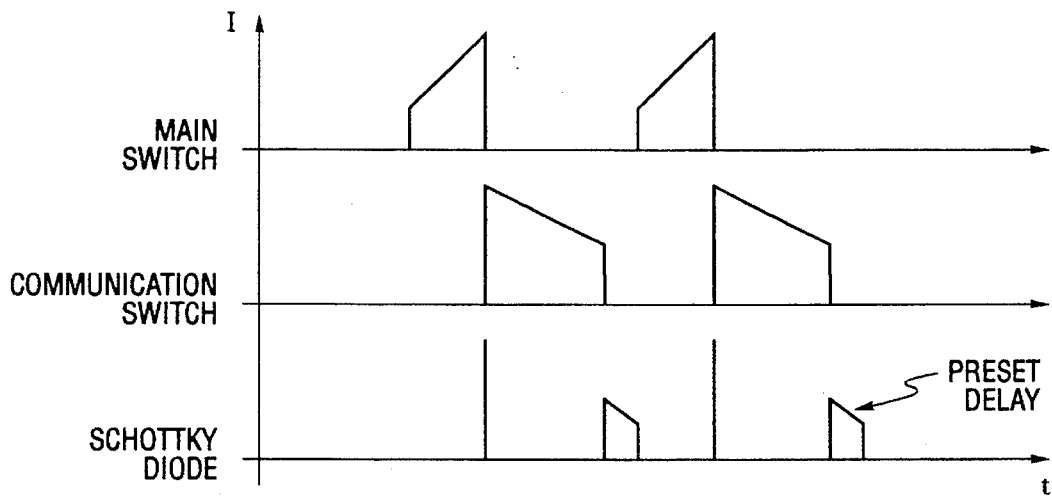
FIG. 1 is a timing diagram of the current flow through a main switch, a commutation switch, and a Schottky diode in a previous switching converter.
Figure 5:
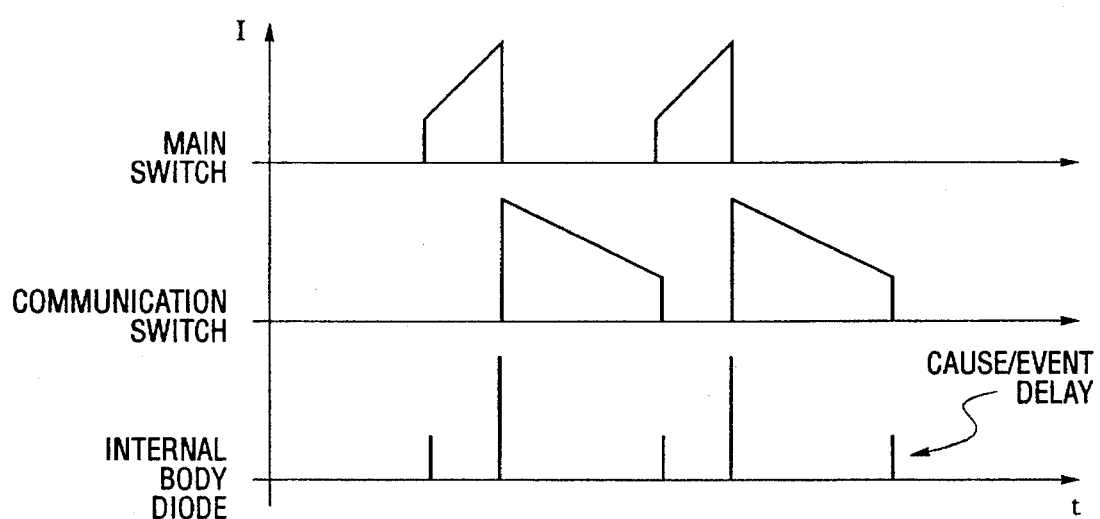
FIG. 5 is a timing diagram of the current flow through the main switch and the commutation switch in an embodiment of the switching converter.

FIG. 5 illustrates a timing diagram of the current flow through the main switching device 20, the commutation switching device 32, and the internal body diode in the MOSFET 74 for an embodiment of the present invention. It can be seen that the current flow through the internal body diode is for a shorter duration of time than the current flow through the Schottky diode illustrated in FIG. 1. As a result, the efficiency of the converter of the present invention is significantly improved.

The above-described embodiments of the present invention have many advantages. By sensing the state of the converter in the switch controller circuit, the main switch and the commutation switch can be alternately turned on and off with minimal delay times during switching transitions. As a result, the converter is more efficient than conventional switching converters and previous synchronized switching converters. Further, by utilizing the internal body diode of the MOSFET commutation switch, the use of a Schottky commutation diode is no longer necessary.

Although the present invention is described in terms of a buck-type switching converter embodiment, one with ordinary skill in the art will recognize that the teachings of the present invention can be employed in other switching topologies, such as forward, flyback, and push-pull. As such, other embodiments of the present invention can be envisioned which are based upon these topologies and other topologies.

More generally, it is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A switching system for use in a power converter, the power converter producing an output signal from an input power source, the power converter including an inductor having a first terminal and a second terminal, the system comprising:

a first switching device which selectively couples and uncouples the first terminal of the inductor to a predetermined signal line in dependence upon a first control signal, the first switching device having a control input which receives the first control signal;

a second switching device which selectively couples and uncouples the first terminal of the inductor to ground in dependence upon a second control signal, the second switching device having a control input which receives the second control signal;

a pulsed signal source which provides a pulsed signal; and a switch controller, coupled to the pulsed signal source and the second switching device, which generates the first control signal and the second control signal, wherein the first control signal enables the first switching device when both the pulsed signal is at a first logical level and the voltage at the control input of the second switching device is less than a first predetermined threshold.

2. The system of claim 1 wherein the first switching device includes a MOSFET having a drain connected to the predetermined signal line, a source connected to the first terminal of the inductor, a gate connected to the control input, and a substrate connected to the source.

3. The system of claim 1 wherein the second switching device includes a MOSFET having a drain connected to the first terminal of the inductor, a source connected to ground, a gate connected to the control input, and a substrate connected to the source.

4. The system of claim 1 wherein the predetermined signal line is connected to the input power source.

5. The system of claim 1 further comprising a switch driver having an input connected to the switch controller to receive the first control signal and an output connected to the control input of the first switching device.

6. The system of claim 1 further comprising a switch driver having an input connected to the switch controller to receive the second control signal and an output connected to the control input of the second switching device.

7. The system of claim 1 wherein the switch controller includes a first NOR gate having a first input, a second input, and an output, wherein the first input is coupled to the pulsed signal source to receive the pulsed signal, and the second input is coupled to ground.

8. The system of claim 7 wherein the switch controller includes a second NOR gate having a first input, a second input, and an output, wherein the first input is coupled to the output of the first NOR gate, the second input is coupled to the control input of the second switching device, and the output produces the first control signal.

9. The system of claim 1 wherein the second control signal generated by the switch controller enables the second switching device when both the pulsed signal is at a second logical level and the voltage at the first terminal of the inductor is less than a second predetermined threshold.

10. The system of claim 9 wherein the switch controller includes a third NOR gate having a first input, a second input, and an output, wherein the first input is coupled to the pulsed signal source to receive the pulsed signal, the second input is coupled to the first terminal of the inductor, and the output produces the second control signal.

11. The system of claim 10 wherein the switch controller includes a diode, a resistor, and a zener diode, wherein a parallel combination of the diode and the resistor couples the first terminal of the inductor to the second input of the third NOR gate, and wherein the zener diode couples the second input of the third NOR gate to ground.

12. The system of claim 1 wherein the pulsed signal source modulates the duty cycle of the pulsed signal in dependence upon the output signal.

13. The system of claim 1 wherein the first control signal disables the first switching device when the pulsed signal transitions to a second logical level.

14. The system of claim 1 wherein the second control signal disables the second switching device when the pulsed signal transitions to the first logical level.

15. A switching power converter having an output and an input which receives an input power source, the converter comprising:

an inductor having a first terminal and a second terminal, wherein the output is coupled to the second terminal;

a capacitor which couples the second terminal of the inductor to ground;

a first MOSFET having a drain, a source, a gate, and a substrate, wherein the drain is coupled to the input, the source is coupled to the first terminal of the inductor, and the substrate is connected to the source;

a second MOSFET having a drain, a source, a gate, and a substrate, wherein the drain is coupled to the first terminal of the inductor, the source is coupled to ground, and the substrate is connected to the source;

a pulsed signal source, responsive to the output, which provides a pulsed signal having a duty cycle based upon the voltage at the output; and a switch controller, coupled to the pulsed signal source and the second MOSFET, which provides a first control signal to the gate of the first MOSFET and provides a second control signal to the gate of the second MOSFET, wherein the first control signal turns on the first MOSFET when both the pulsed signal is at a first logical level and the voltage at the gate of the second MOSFET is less than a first predetermined threshold.

16. The power converter of claim 15 further comprising a switch driver having an input connected to the switch controller to receive the first control signal and an output connected to the gate of the first MOSFET.

17. The power converter of claim 15 further comprising a switch driver having an input connected to the switch controller to receive the second control signal and an output connected to the gate of the second MOSFET.

18. The power converter of claim 15 wherein the switch controller includes a first NOR gate having a first input, a second input, and an output, wherein the first input is coupled to the pulsed signal source to receive the pulsed signal, and the second input is coupled to ground.

19. The power converter of claim 18 wherein the switch controller includes a second NOR gate having a first input, a second input, and an output, wherein the first input is coupled to the output of the first NOR gate, the second input is coupled to the gate of the second MOSFET, and the output produces the first control signal.

20. The power converter of claim 15 wherein the second control signal generated by the switch controller turns on the second MOSFET when both the pulsed signal is at a second logical level and the voltage at drain of the second MOSFET is less than a second predetermined threshold.

21. The power converter of claim 20 wherein the switch controller includes a third NOR gate having a first input, a second input, and an output, wherein the first input is coupled to the pulsed signal source to receive the pulsed signal, the second input is coupled to the drain of the second MOSFET, and the output produces the second control signal.

22. The power converter of claim 21 wherein the switch controller includes a diode, a resistor, and a zener diode, wherein a parallel combination of the diode and the resistor couples the drain of the second MOSFET to the second input of the third NOR gate, and wherein the zener diode couples the second input of the third NOR gate to ground.

23. The power converter of claim 15 wherein the first control signal turns the first MOSFET off when the pulsed signal transitions to a second logical level.

24. The power converter of claim 15 wherein the second control signal turns the second MOSFET off when the pulsed signal transitions to the first logical level.

25. A switching power converter having an output and an input which receives an input power source, the converter comprising:

an inductor having a first terminal and a second terminal, wherein the output is coupled to the second terminal;

a capacitor which couples the second terminal of the inductor to ground;

a first MOSFET having a drain, a source, a gate, and a substrate, wherein the drain is coupled to the input, the source is coupled to the first terminal of the inductor, and the substrate is connected to the source;

a second MOSFET having a drain, a source, a gate, and a substrate, wherein the drain is coupled to the first terminal of the inductor, the source is coupled to ground, and the substrate is connected to the source;

a pulsed signal source, responsive to the output, which provides a pulsed signal having a duty cycle based upon the voltage at the output; and a switch controller, coupled to the pulsed signal source and the second MOSFET, which provides a first control signal to the gate of the first MOSFET and provides a second control signal to the gate of the second MOSFET, wherein the first control signal turns on the first MOSFET when both the pulsed signal is at a first logical level and the voltage at the gate of the second MOSFET is less than a first predetermined threshold, and the first control signal turns the first MOSFET off when the pulsed signal transitions to a second logical level, wherein the second control signal turns on the second MOSFET when both the pulsed signal is at the second logical level and the voltage at drain of the second MOSFET is less than a second predetermined threshold, and the second control signal turns the second MOSFET off when the pulsed signal transitions to the first logical level.

\* \* \* \* \*